April 5, 1949.
J. L. BOON
2,466,364
CONTROL DEVICE FOR ELECTRIC MOTORS
Filed Sept. 4, 1942
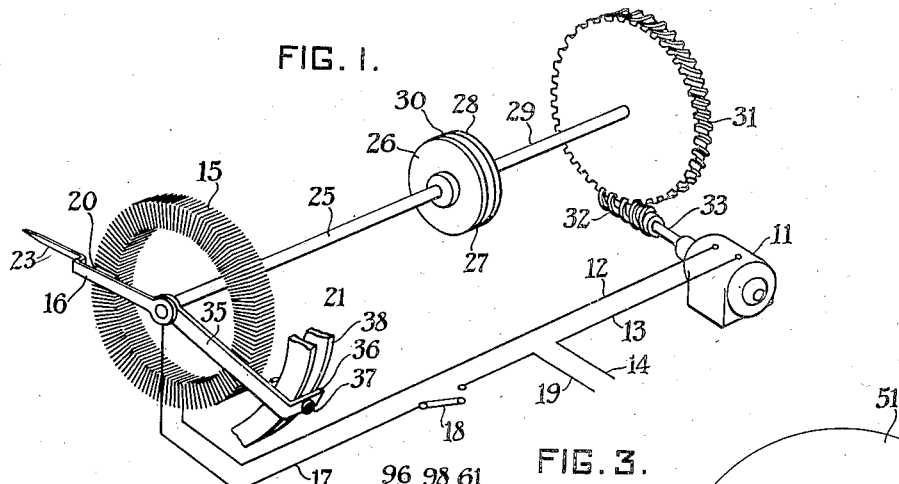
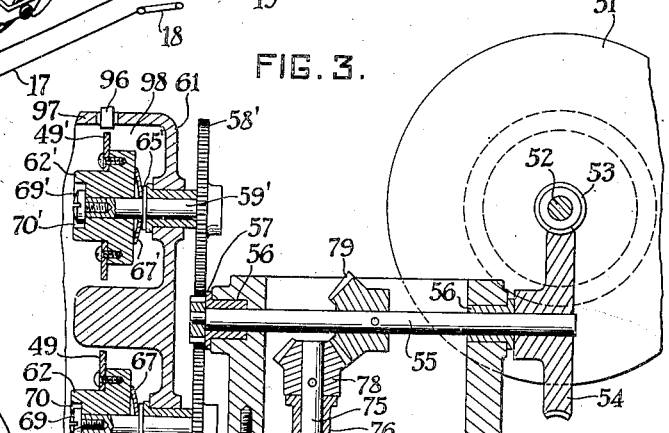
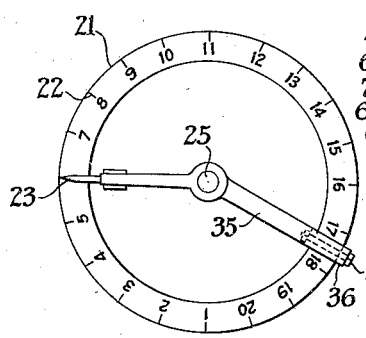
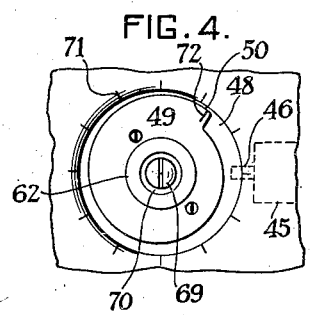
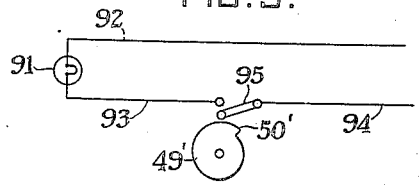
JOSEPH L. BOON
INVENTOR
BY *[signatures]*
ATTORNEYS Patented Apr. 5, 1949

2,466,364

UNITED STATES PATENT OFFICE 2,466,364

CONTROL DEVICE FOR ELECTRIC MOTORS

Joseph L. Boon, Rochester, N. Y., assignor to Eastman Kodak Company, Rochester, N. Y., a corporation of New Jersey Application September 4, 1942, Serial No. 457,297

2 Claims. (Cl. 318—396)

The invention relates to control devices, and more particularly to starting and control devices especially suitable for electric motor drives for high speed cameras.

One object of the invention is the provision of a starting rheostat for an electric motor, and a preset or adjustable stop which may be selectively and manually positioned to limit the movement of the rheostat arm to thereby limit or control the speed of the motor to a desired or predetermined point.

Another object of the invention is the provision of an adjustable control which may be selectively positioned to open a switch in the motor circuit to stop the motor after a predetermined time interval.

Still another object of the invention is the provision of an adjustable or preset member for controlling an independent electrical circuit in timed relation to the start of the motor.

A further object of the invention is the provision of controls of the class above described which are simple in construction, readily, easily and accurately adjustable, and effective in their operation.

To these and other ends, the invention resides in certain improvements and combinations of parts, all as will be hereinafter more fully described, the novel features being pointed out in the claims at the end of the specification.

In the drawings:

Fig. 1 is a schematic view of an electric motor and a starting rheostat therefor, showing the arrangement for connecting the rheostat in to the motor, and a limiting stop for the rheostat for controlling the motor speed;

Fig. 2 is a front view of the rheostat illustrated in Fig. 1, showing the relation of the movable rheostat arm and the limiting stop therefor;

Fig. 3 is a sectional view through a modified control member and the structure by which the controls are connected to and driven by the motor in a timed relation therewith;

Fig. 4 is a front view of one of the controls illustrated in Fig. 3, showing the relation of the control cam and the electrical switch which is operated thereby; and Fig. 5 shows an external electrical circuit, and the relation thereto of one of the control members or cams illustrated in Fig. 3.

Similar reference numerals throughout the various views indicate the same parts.

The present invention relates to control devices for an electric motor primarily intended for use in a motion picture camera, particularly a high speed camera of the type shown in the patent to Tuttle, No. 2,008,973. Although designed for use in such a camera, the controls of the present invention are not intended to be limited thereto as it is contemplated that such motor controls are adapted to a wide variety of uses in which such motor controls are necessary or desirable. The present invention is, therefore, to be limited only insofar as necessitated by the prior art and the scope of the appended claims. However, as the present invention relates to the motor controls per se, the various parts of the camera itself are omitted, as it is believed that a showing of such parts is not necessary to a full understanding of the present invention.

Fig. 1 shows an electric motor 11 to which are connected electric leads or wires 12 and 13, the latter being, in turn, connected to a main supply line 14. As is well known, a rheostat is often connected in the circuit of an electric motor to protect the latter during the starting operation and/or to control the speed of the motor. Such rheostats are designed so that when the motor is started, the maximum resistance of the rheostat is in the motor circuit so that the motor speed will be relatively slow. The rheostat arm is then gradually moved to progressively cut out resistances and thereby increase the motor speed, all of which is well known in the art and does not need further explanation.

The rheostat illustrated in the present invention comprises an annular resistance member 15, of well known construction, connected to the motor 11, by means of the wire 12. The rheostat arm 16, on the other hand, is connected through a wire 17 and starting switch 18 to the other supply line 19. It is now apparent that when the switch 18 is closed and the arm 16 is at the position indicated by the numeral "1," Fig. 2, the maximum resistance of the member 15 is in the motor circuit, and the motor will run at its minimum speed. However, the movement of the arm 16 in a clockwise direction will gradually move the contact 20 thereof over the resistance element 15 to gradually cut out the resistance and thereby increase the motor speed. The movement of the arm 16 may be stopped at any point, and the motor speed will then correspond to the position of the arm. A casing 21 encloses the resistance member 15, and has inscribed thereon a suitable scale 22 which may designate the resistance cut out or the motor speed, and with which the pointer 23 of the arm 16 will cooperate, as clearly illustrated in Fig. 2.

The rheostat arm 16 may be moved manually, but it is preferred to operatively connect the arm to the motor 11 so as to be automatically moved thereby and in timed relation with the starting thereof. To this end, the arm 16 is secured to one end of a shaft 25, the other end of which has mounted thereon a disk 26 forming a part of a slip clutch, broadly designated by the numeral 27. A second disk 28 of the slip clutch is mounted on one end of a shaft 29 and connected to the disk 26 through a disk of friction material 30 positioned between the two disks 26 and 28, as shown in Fig. 1. The friction clutch parts may be retained in assembled relation in any suitable and well-known manner, as for example, as shown in Fig. 3 and to be later more fully described. The other end of the shaft 29 carries a worm wheel 31 driven by a worm 32 on the motor shaft 33. The latter may be directly coupled, in a manner not shown, to the film drive sprocket.

It is thus apparent from Fig. 1 that when the starting switch 18 is closed, the motor 11 will be energized and the motor shaft 33 will be rotated. Such rotation will drive the worm 32, worm wheel 31 and shaft 29. Rotation of the latter is transmitted through the slip clutch 27 to rotate the shaft 25 as a unit with the shaft 29 to move the rheostat arm 16 in a clockwise direction over the resistance element 15 to gradually decrease the resistance in the motor circuit and thereby increase the motor speed, all of which is well known to those in the art.

The object or objects to be photographed with a high speed camera move very rapidly, or the operation or time duration thereof is exceedingly brief so that in order to secure accurate and satisfactory photographic records the drive motor should be at a definite speed, or at least above a minimum desired speed before the exposure is made. This desired speed can be secured by limiting or arresting the movement of the rheostat arm 16 when the latter reaches a proper or desired position, as indicated by the scale 21. However, as this minimum desired speed varies with conditions and with the subjects being photographed, the final position of the arm 16 along the scale 21 will correspondingly vary to provide the desired or required motor speed.

In order to secure such variable speed control, the present invention provides a movable or adjustable stop adapted to be positioned in the path of the rheostat arm 16 or the pointer 23 thereof to arrest the movement of the arm 16 to thus limit the amount of resistance which is cut out of the motor circuit and thus control the motor speed. This stop comprises, in the present embodiment, an L-shaped member, one arm 35 of which is loosely mounted on the shaft 25 to project radially therefrom and to overlie the scale 21 with which it cooperates to indicate the setting of the stop. The other arm 36 of the stop member overlies the outer surface of the casing 21, as best shown in Fig. 1. The stop member is thus freely movable about the shaft 25 and over the scale 21 and may be readily and easily adjusted to the desired position relative thereto to assure the desired minimum motor speed. When the stop is properly adjusted, it may be locked or secured in adjusted position in any suitable and well-known manner, as for example, by a locking member 37 arranged to be screwed or clamped down to draw the arm 36 of the stop member into clamping engagement with the outer surface 38 of the casing 21. The stop may thus be moved and securely retained in any desired position of adjustment.

It is now apparent that when the rheostat arm 16 is moved, in a manner above described, the resistance of the motor circuit will be gradually decreased and the motor speed will accordingly increase. However, upon engagement of the arm 16 with the stop member 35, the arm 16 is held positively against further movement to limit the amount of resistance cut out of the motor circuit to thus secure the desired or minimum motor speed. Of course, a slight lag may occur between the engagement of the rheostat arm 16 with the stop 35 and the attainment of motor speed corresponding to the stop setting or adjustment, as is well known. Furthermore, the engagement of the rheostat arm 16 with the stop will limit further rotation of the arm 16 of the shaft 25, but as the shaft 29 is being continually rotated by the motor 11, a slippage occurs in the slip clutch 27 to permit the required relative movement between the clutch disk 26 and 28, as will be readily apparent.

By means of the above arrangement, the motor is started up upon closing the starting switch 18, and the motor will then be gradually brought up to substantially the desired or minimum required speed, whereupon the rheostat arm 16 will engage the stop member 35 to limit further movement of the rheostat arm to thus retain the motor at or above the desired minimum speed. After the film strip has been run through the camera, the switch 18 may be opened to break the motor circuit to stop the motor 11. It is preferred, however, to provide a means whereby the motor circuit is automatically opened when the film supply is exhausted or after a predetermined length of film has been run through the camera.

To secure this result, a second switch, preferably a micro switch 45, is arranged in the circuit of the motor 11 and in series with the starting switch 18, in a manner not shown but believed to be readily apparent to those in the art. The switch 45 is of the normally closed type and is provided with a protruding pin or button 46 which extends through a portion 47 of the front wall of the camera body and into a recess 48 formed therein. A switch opening or control member in the form of a cam 49 is rotatably mounted in the recess 48, in a manner to be later described, and is provided with a portion 50 adapted to engage and move the button 46 to open the switch 45 to stop the motor. The cam 49 is accessible from the front of the camera and may be manually rotated to actuate the switch 45, but it is preferred to operatively connect the cam to the motor 11 so that the opening of the switch will be in timed relation to the movement of the film through the camera or to the starting of the motor.

To secure this result, the motor 11 is connected by means of a belt drive, not shown, to a pulley 51 mounted on a shaft 52 which carries a worm 53 adapted to engage and drive a worm wheel 54 secured to one end of a control shaft 55. The shaft 53 may be connected, in any suitable manner, to the film take-up spool or reel to drive the latter. The shaft 55 is supported in spaced bearings 56 formed in the camera body, and has secured to the opposite end thereof a pinion 57 which meshes with a gear 58 secured to the inner end of the cam carrying shaft 59. The latter extends through a bushing or sleeve 60 positioned in a portion 61 of the front wall of the camera and projects into the recess 48 to receive a knob 62 formed with an annular flange 63 to which the cam 49 is secured by screws, or other suitable fastening means, all as clearly shown in Fig. 3. The shaft 59 is thus driven by the motor 11 and in timed relation therewith. The cam supporting knob 62 is adjustably connected to the shaft 59, in a manner to be later described, so that the knob and cam may be rotated relative to the shaft to initially adjust or set the cam so that the latter will actuate the switch 45 in a timed relation to the movement of the film strip through the camera or the starting of the motor 11.

The cam knob 62 is preferably adjustably mounted on the shaft 59 so that it may be rotated relative thereto to adjust or set the cam 49 to operate the switch 45 at a predetermined time. For example, if a film roll of 100 feet is used in the camera, the cam 49 and knob 62 may be set as a unit so that when the 100 feet had been run through the camera the portion 50 of the cam 49 will engage and move the button 46 to open the switch 45. Thus the cam may be set to shut off the motor after a predetermined length of film has been run through the camera, or after a film strip of a definite length has been used. This adjustable feature is secured in the present embodiment by loosely mounting the cam knob 62 on the shaft 59 which is provided with a flange or collar 65 spaced from the rear face 66 of the knob 62. A bowed annular spring 67 surrounds the shaft 59 and is positioned intermediate the collar 65 and the face 66 of the knob 62 and tends to force the latter to the left, as viewed in Fig. 3. A screw 68 is threaded into the end of the shaft 59 and has a head 69 thereof in engagement with the recessed face 70 of the knob 62 to hold the latter in axial position on the shaft 59, as clearly shown in Fig. 3. The flange 65, the spring 67, and the screw 68 with its head 69 provide a friction connection and driving means between the knob 62 and the shaft 59. By means of this arrangement, the knob will be driven as a unit with the shaft 59. However, the knob 62 and cam 49 may be rotated relative to the shaft 59 to initially set or adjust the cam 49. The scale 71 formed on the front camera wall cooperates with an indicating mark on the cam 49, such as the mark 72, to facilitate the initial setting or adjustment of the cam.

With the arrangements shown in Fig. 3, the rheostat, illustrated in Fig. 1, may be driven by the motor 11 in the manner shown in Fig. 1 and above described. It is preferred, however, to operatively connect the rheostat arm 16 to the shaft 55 so as to be driven thereby. It will be apparent that in this arrangement, the rheostat arm will also be driven by the motor 11 and in timed relation therewith. In this modified drive of the rheostat arm, a shaft 75 is rotatably mounted in a sleeve 76 carried by a plate 77 and has mounted on one end thereof a bevel gear 78 which meshes with a bevel gear 79 carried by the shaft 55. The other end of the shaft 75 has formed thereon a disk 80 of a slip clutch broadly designated as 81 which may be of the same construction as that illustrated in Fig. 1, and above described. A second disk 82 of the slip clutch is spaced from and connected to the disk 80 by a plate 83 of friction material. The clutch parts are retained in assembled relation by U springs 84, each of which has one leg 85 thereof secured or anchored to the face 86 of the disk 80 by suitable fastening means, and a free leg 87 which yieldably engages the exposed face of the disk 82 to press the latter towards the disk 80 to provide a frictional driving connection therewith. The disk 82 is formed on the end of a shaft 89 which may be suitably connected to the rheostat arm 16 to rotate the latter in the same manner as the shaft 25 above described.

Sometimes, it is desirable to photographically record the operation of an electrical device arranged in an electrical circuit which is positioned externally of the camera and independent of the circuit of the motor 11. Fig. 5 is a schematic example of such an arrangement in which a lamp 91, such as a photoflash lamp, is connected by wires 92, 93, and 94 and switch 95 to a suitable source of electrical energy independent of the motor circuit. It is apparent that when the switch 95 is closed, the lamp 95 will be energized. As is well known, the flash of such lamp is exceedingly brief, being only a few thousandths of a second. With such a short time duration, it is essential to the securing of accurate and satisfactory photographic records of the flash that the motor should attain the desired speed, or at least be above a minimum required speed before the switch 95 is closed to flash the lamp 91. For this reason, the closing of the switch 95 is preferably controlled from the motor 11 so as to be actuated in timed relation therewith. For example, it may be desirable to delay the closing of the switch 95 until say 75 feet of film had been run through the camera thus assuring that the motor has attained the desired speed when the flash is recorded.

To secure this result, the switch 95, which is also preferably a micro switch similar to switch 45, is mounted in the camera body so that an operating button 96 thereof projects through a wall 97 of the camera and into a recess 98 arranged adjacent the recess 48 of the cam 49, as clearly shown in Fig. 3. The switch 95 is connected to terminals of a plug-in socket, not shown, mounted on the camera body and to which the lines 93 and 94 may be connected to insert the switch 95 in series therewith, as schematically illustrated in Fig. 5. The closing of the switch 95 may be controlled by a cam 49' shown in Fig. 5. As the structure and driving arrangements for the cams 49 and 49' are duplicates, the detailed description relating thereto need not be repeated, and corresponding parts will be designated by the same numerals except those relating specifically to cam 49' will be differentiated by the addition of a prime to the various numerals, as will be apparent from Fig. 3. The cam 49', like cam 49, may be initially adjusted so the operating portion 50' thereof will not engage the button 96 of the switch 95 until a predetermined length of film has been run through the camera, or until a predetermined time interval has elapsed after the closing of the starting switch 18. A suitable scale and mark, not shown, similar to the scale 71 and mark 72, may be provided for initially adjusting the cam 49'.

Thus each cam 49 and 49' is operatively connected to and driven by the motor 11 and in timed relation therewith. However, each cam may be separately and independently selectively adjusted to actuate the switch associated therewith in a predetermined relation to the actuation of the other switch, or the movement of the film strip. Obviously, the cam 49' will be set to trip or close the switch 95 prior to the opening of the switch 45 by the cam 49. However, if no external circuit, such as that shown in Fig. 5 is connected to switch 95, the latter will be inoperative and only the switch 45 will be opened by the cam 49 in accordance with the initial setting or adjustment of the latter.

The operation of the structure illustrated in Fig. 3 may be briefly summarized as follows:

With high speed cameras, the object or subject being photographed either moves quite rapidly or has a very short interval of operation, often being not more than a few thousandths of a second, as in the case of the flash of a lamp, such as the lamp 91. In order to secure accurate photographic records of such subjects, it is essential that the drive motor attain, or at least be above, a desired minimum speed before the exposure is made. For this reason, the cam 49' is manually adjusted so as to trip or close the switch 95 to momentarily energize the lamp 91 after say 75 feet of film has been run through the camera. This delay of 75 feet will insure that the motor and film are at the required speed to accurately record the flash of the lamp 91 before the switch 95 is closed. If a 100-foot roll or reel of film is used, the cam 49 is then set or adjusted to open the switch 45 after 100 feet have been run. Obviously if a film of a different length is used, the cam 49 is adjusted to correspond to such length so as to trip the switch 45 when the film supply is exhausted. Thus the cams 49 and 49' are initially adjusted or preset in a predetermined relation and prior to the closing of the starting switch 18. The latter is then closed to start the motor 11 which, through the belt drive, pulley 51, worm and worm wheel 53 and 54, drives the rheostat arm 16 until the latter engages the adjusted stop arm 35 to control the motor speed. Rotation of the shaft 55 also rotates the pinion 57 to simultaneously and uniformly drive the equal sized gears 58 and 58' at the same speed and in timed relation to the motor 11. The gears 58 and 58' in turn, drive the shafts 59 and 59' on which the cam knobs 62 and 62' are frictionally mounted. The cams 49 and 49' are thus driven at the same speed by the motor 11 and in timed relation therewith. When the motor has been run for a time interval in accordance with the initial setting of the cam 49', the portion 50' of the latter then engages the button 96 to operate the switch 95 to close the latter to momentarily energize the lamp 91. Of course, if this external circuit is not used, the cam 49' need not be set and may be disregarded. The motor continues to rotate the cams 49 and 49' until a time interval has elapsed corresponding to the adjustment of the cam 49. Whereupon, the switch 45 is opened to break the motor circuit to stop the motor.

The present invention thus provides controls which are driven by and operated in timed relation to the starting of the motor, or the movement of a film strip through the camera. Certain of the controls may be initially adjusted or preset so as to control certain operations in predetermined timed relations.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a control device for a high speed camera, the combination with an electric motor, of a rheostat connected in the circuit of said motor to control the speed thereof, means including a slip clutch for operatively connecting said rheostat to said motor so as to be driven thereby and in timed relation therewith, an adjustable stop for limiting the movement of said rheostat to selectively control the speed of said motor, a switch in the circuit of said motor, an adjustable time control member for said switch, and means for operatively connecting said control member to said motor to be operated thereby to open said switch to stop said motor in accordance with the time adjustment of said control member.

2. In a control device for a high speed camera, the combination with an electric motor, of a rheostat connected in the circuit of said motor and provided with a movable arm for adjusting said rheostat to control the speed of motor, means for operatively connecting said arm to said motor to be driven thereby and in timed relation therewith, a stop member movable to a predetermined position in the path of said arm to limit the movement of the latter to selectively control the speed of said motor, a switch arranged in the circuit of said motor, an adjustable control member, means for operatively connecting said control member to said motor to be driven thereby, and an actuating portion on said control adapted to engage and open said switch to stop said motor after a time interval determined by the adjustment of said control member.

JOSEPH L. BOON.

REFERENCES CITED

The following references are of record in the file of this patent:

UNITED STATES PATENTS

| Number | Name | Date |
|---|---|---|
| 353,987 | Sperry | Dec. 7, 1886 |
| 543,524 | Fiske | July 30, 1895 |
| 728,814 | Whittingham | May 19, 1903 |
| 1,393,394 | Phillips | Oct. 11, 1921 |
| 1,440,803 | Uphoff | Jan. 2, 1923 |
| 1,495,045 | Rankin | May 20, 1924 |
| 1,571,526 | Minton | Feb. 2, 1926 |
| 1,645,720 | Pfanstiehl | Oct. 18, 1927 |
| 1,937,603 | Brandenburger | Sept. 11, 1934 |
| 2,176,195 | Bassett | Oct. 17, 1939 |
| 2,269,246 | Bloomfield | Jan. 6, 1942 |